(12) United States Patent
Fukasawa et al.

(10) Patent No.: US 11,127,429 B2
(45) Date of Patent: Sep. 21, 2021

(54) MAGNETIC RECORDING MEDIUM INCLUDING ANILINE MATERIAL, METHOD FOR MANUFACTURING SAME, AND LAMINATE FOR HEAT TRANSFER

(71) Applicant: DIC Corporation, Tokyo (JP)

(72) Inventors: Akira Fukasawa, Kitaadachi-gun (JP); Toshiaki Adachi, Kitaadachi-gun (JP); Daisuke Yano, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 173 days.

(21) Appl. No.: 16/092,949

(22) PCT Filed: Apr. 13, 2017

(86) PCT No.: PCT/JP2017/015105
§ 371 (c)(1),
(2) Date: Oct. 11, 2018

(87) PCT Pub. No.: WO2017/188004
PCT Pub. Date: Nov. 2, 2017

(65) Prior Publication Data
US 2020/0185000 A1    Jun. 11, 2020

(30) Foreign Application Priority Data
Apr. 28, 2016  (JP) .............................. JP2016-089981

(51) Int. Cl.
G11B 5/72 (2006.01)
G11B 5/84 (2006.01)
G06K 19/06 (2006.01)
G11B 5/708 (2006.01)
G11B 5/80 (2006.01)

(52) U.S. Cl.
CPC .......... *G11B 5/84* (2013.01); *G06K 19/06187* (2013.01); *G06K 19/06196* (2013.01); *G11B 5/708* (2013.01); *G11B 5/728* (2020.08); *G11B 5/80* (2013.01); *G11B 5/72* (2013.01)

(58) Field of Classification Search
None
See application file for complete search history.

(56) References Cited

U.S. PATENT DOCUMENTS

| 3,884,869 A | * | 5/1975 | Conger, Sr. ............. C09B 59/00 |
| | | | 524/254 |
| 4,315,145 A | * | 2/1982 | Nishikawa ............. G11B 5/716 |
| | | | 235/493 |
| 6,117,540 A | * | 9/2000 | Tanaka ..................... C09D 7/68 |
| | | | 428/323 |
| 2008/0090726 A1 | * | 4/2008 | Eskra ..................... B41M 5/385 |
| | | | 503/207 |
| 2008/0102297 A1 | * | 5/2008 | Wu .......................... C23C 30/00 |
| | | | 428/469 |
| 2008/0305365 A1 | * | 12/2008 | Yamazaki ................ G11B 5/72 |
| | | | 428/833 |
| 2017/0096564 A1 | * | 4/2017 | Seeger ..................... B05D 5/00 |
| 2017/0291401 A1 | * | 10/2017 | Yamane ................... C09D 7/70 |
| 2018/0117951 A1 | * | 5/2018 | Demange ............... B42D 25/46 |

FOREIGN PATENT DOCUMENTS

| CN | 104246885 A | 12/2014 |
| JP | 62-152788 A | 7/1987 |
| JP | S62-152788 A | 7/1987 |
| JP | 1-176325 A | 7/1989 |
| JP | H01-176325 A | 7/1989 |
| JP | 3-192516 A | 8/1991 |
| JP | H03-192516 A | 8/1991 |
| JP | 3-256799 A | 11/1991 |
| JP | 7-44922 A | 2/1995 |
| JP | 2002-230737 A | 8/2002 |
| JP | 2003041127 A | * 2/2003 |
| JP | 2009-245565 A | 10/2009 |
| JP | 2009-259402 A | 11/2009 |
| WO | 2014/069977 A1 | 5/2014 |

OTHER PUBLICATIONS

JP-2003041127-A Abstract Translation (Year: 2003).*
International Search Report dated Jul. 4, 2017, issued in counterpart International Application No. PCT/ JP2017/015105 (2 pages).

* cited by examiner

*Primary Examiner* — Kevin M Bernatz
(74) *Attorney, Agent, or Firm* — Westerman, Hattori, Daniels & Adrian, LLP

(57) ABSTRACT

A problem to be solved by the present invention is to provide a magnetic recording medium having a jet-black magnetic stripe which is not tinged with red. The present invention is directed to a magnetic recording medium including: a magnetic recording layer on a substrate; and a protective layer (a) on the magnetic recording layer, wherein the protective layer (a) contains an aniline coloring material. The magnetic recording medium is advantageous in that the magnetic stripe is jet-black and has excellent design properties, and therefore can be widely used for credit cards, bank cards and the like.

8 Claims, No Drawings

MAGNETIC RECORDING MEDIUM INCLUDING ANILINE MATERIAL, METHOD FOR MANUFACTURING SAME, AND LAMINATE FOR HEAT TRANSFER

TECHNICAL FIELD

The present invention relates to a magnetic recording medium and a laminate for heat transfer used in producing the same.

BACKGROUND ART

Magnetic recording media are widely used for, for example, credit cards, bank cards and the like. Generally, known magnetic recording media have a magnetic stripe formed on the surface of a substrate, such as a plastic or paper sheet (see PTL 1). The magnetic stripe, for example, in the case of the credit card indicates a magnetic recording area formed on a part of the surface of the card, and, as observed from the side of the magnetic stripe, the magnetic stripe generally comprises a magnetic recording layer and optionally a protective layer famed on the surface of the magnetic recording layer.

The credit cards and the like are recently required by the market to have high design properties, and, for example, a magnetic recording medium colored jet-black with a quality is desired.

For achieving design harmonization with the substrate (card substrate) constituting the magnetic recording medium, it is likely that the design of the magnetic stripe formed on the magnetic recording medium is preferred to have similar color to the color of the substrate (card substrate). For this reason, the magnetic recording medium colored jet-black with a quality is generally required to have a magnetic stripe with a jet-black color equivalent to the color of the substrate (card substrate).

A known magnetic recording medium having the black magnetic stripe includes, for example, a magnetic stripe comprising a magnetic recording layer containing carbon black and a protective layer.

However, as viewed from the protective layer side of the magnetic stripe, the magnetic stripe is seen slightly reddish black due to carbon black, and therefore it is likely that the magnetic recording medium is collectively poor in the design properties and quality.

CITATION LIST

Patent Literature

PTL 1: JP-A-2002-230737

SUMMARY OF INVENTION

Technical Problem

A problem to be solved by the present invention is to provide a magnetic recording medium having a jet-black magnetic stripe which is not tinged with red.

Solution to Problem

To solve the above problem, the present invention is directed to a magnetic recording medium including: a magnetic recording layer on a substrate; and a protective layer (a) on the magnetic recording layer, wherein the protective layer (a) contains an aniline coloring material.

Advantageous Effects of Invention

The magnetic recording medium of the invention is advantageous in that the magnetic stripe shows jet-black and has excellent design properties and, especially when the color of the substrate (card substrate) is jet-black, the colors of the whole card are harmonized, and therefore the magnetic recording medium can be widely used for credit cards and bank cards with high design properties and the like.

DESCRIPTION OF EMBODIMENTS

The magnetic recording medium of the invention is a magnetic recording medium including a magnetic recording layer on a substrate; and a protective layer (a) on the magnetic recording layer, wherein the protective layer (a) contains an aniline coloring material.

The substrate is first described below.

With respect to the substrate, there can be used, for example, a substrate in a sheet form or a film form, which is famed from polyvinyl chloride, a polyvinyl chloride-vinyl acetate copolymer, a polycarbonate, polyethylene terephthalate, PET-G, paper, synthetic paper, or the like.

As the substrate, for example, a sheet of a single layer formed from the polyvinyl chloride or the like can be used, or a laminate obtained by heat pressing two or more sheets or the like can be used.

The substrate having an arbitrary form and an arbitrary thickness can be used, and, for example, the substrate having a thickness in the range of from 0.1 to 1.0 mm can be used. Especially, the substrate having a thickness in the range of from 0.84 mm (maximum) to 0.68 mm (minimum), as defined by the Japanese Industrial Standards (JIS X6301) "Identification cards", is preferably used.

The magnetic recording medium of the invention has the magnetic stripe on the surface of the substrate.

The magnetic stripe is a layer having a magnetic recording layer and a protective layer (a) for protecting the surface of the magnetic recording layer.

The magnetic recording layer constitutes a layer which is capable of magnetically recording various types of information, and, for example, there can be mentioned a layer containing a magnetic material, a binding resin, and, if necessary, various additives.

With respect to the magnetic material contained in the magnetic recording layer, for example, $\gamma$-iron oxide, magnetite, cobalt-coated iron oxide, chromium dioxide, an iron metal magnetic powder, strontium ferrite, barium ferrite, or the like can be used. The magnetic material in a powdery form is preferably used.

With respect to the binding resin, for example, a polyvinyl chloride resin, an acrylic resin, an acrylic urethane resin, a nitrocellulose resin, a polyurethane resin, a polyester resin, and the like can be used individually or in combination.

In the magnetic recording layer, in addition to the above-mentioned materials, if necessary, various additives can be used, and, for example, a coloring material, a dispersant, a crosslinking agent, a plasticizer, a surfactant, a silane coupling agent, or other fillers can be used.

Especially, the coloring material is preferred for coloring the magnetic stripe black. It is preferred to use the coloring material containing, for example, carbon black or a black coloring material, such as an aniline coloring material, and it is preferred to use carbon black.

With respect to the carbon black, there is no particular limitation and any carbon black can be used as long as it can effectively fill voids between particles of the magnetic material to color the magnetic stripe black and can effectively prevent the occurrence of an error in reading the magnetically recorded data, but it is preferred to use carbon black having an average particle diameter in the range of from 20 to 50 nm.

As the carbon black, it is preferred to use carbon black having excellent dispersibility in the binding resin. As examples of carbon black having high dispersibility, there can be mentioned those having a pH of 2 to 5.

With respect to the dispersant, for further improving the dispersibility of carbon black in the binding resin, it is preferred to use a dispersant, such as a synergist. It is preferred that the dispersant is used in an amount in the range of from 3 to 10% by mass, based on the mass of the carbon black.

With respect to the crosslinking agent, for improving the strength of the magnetic recording layer, it is preferred to use an isocyanate compound. It is preferred that the isocyanate compound is used in an amount in the range of from 20 to 30 parts by mass, relative to 100 parts by mass of the binding resin.

The protective layer (a) is a layer with which a magnetic head is in contact when reading signals recorded in the magnetic recording layer, and which is formed on the upper surface (the surface side) of the magnetic recording layer. Therefore, the protective layer (a) is needed to have, for example, mechanical properties, such as an abrasion resistance.

The protective layer (a) containing an aniline coloring material and a binding resin is used for preventing the layer from being tinged with red and imparting a jet-black color.

With respect to the aniline coloring material, there is no particular limitation and any aniline coloring material can be used. Especially, it is preferred to use the aniline coloring material that is free of chromium, which has reduced a load on a human body or the environment, and it is preferred to use the aniline coloring material which contains no chromium ion or has a chromium ion content of 2 ppm or less.

The amount of the aniline coloring material contained can be appropriately controlled according to the color of the substrate. However, when the substrate having a jet-black color tone is used, the amount of the aniline coloring material contained, based on the mass of the protective layer (a), is preferably in the range of from 20 to 40% by mass because the protective layer according to the color of the substrate can be further advantageously formed, more preferably in the range of from 20 to 30% by mass because the protective layer having further excellent abrasion resistance can be formed without sacrificing the color.

With respect to the binding resin usable for foaming the protective layer (a), a resin being relatively hard and having excellent abrasion resistance can be used.

As the binding resin, a cellulose resin, an acrylic resin, an urethane resin, or the like can be used. As the cellulose resin, cellulose acetate, cellulose acetate butyrate, cellulose acetate nitrate, cellulose acetate propionate, or the like can be used.

In the protective layer (a), for further improving mechanical properties, such as an abrasion resistance, a crosslinking agent can be used.

An isocyanate compound can be used as the crosslinking agent. It is preferred that the isocyanate compound is contained in an amount of 20 to 30 parts by mass, relative to 100 parts by mass of the binding resin.

Further, in the protective layer (a), for further improving mechanical properties, such as an abrasion resistance, a lubricant can be used. As the lubricant, preferred is a polyolefin, more preferred is a polyethylene wax, and more preferred is a polyethylene wax having a particle diameter of 5 μm or less.

It is preferred that the protective layer (a) has a two-layer structure comprising a protective layer (a2) having excellent abrasion resistance and a protective layer (a1) which can contribute to maintaining high design properties.

The protective layer (a) preferably comprises the protective layer (a1) and the protective layer (a2) on this order as viewed from the side in contact with the magnetic recording layer.

It is preferred that, among the protective layer (a1) and the protective layer (a2), at least the protective layer (a1) is a layer containing the aniline coloring material for foaming a jet-black magnetic stripe which is unlikely to be tinged with red. For preventing generation of interference fringes on the surface of the protective layer (a) of the magnetic recording medium, it is more preferred that both the protective layer (a1) and the protective layer (a2) area layer containing the aniline coloring material.

The jet-black color properties of the magnetic stripe, that is, the jet-black color properties of the portion formed from the magnetic recording layer and the protective layer (a) constituting the magnetic recording medium of the invention, as observed from the protective layer (a) side, can be checked by a CIE 1976 (L*a*b*) color space as observed from the surface side of the protective layer (a). An L value of the magnetic stripe is preferably in the range of from 0 to 10, more preferably in the range of from 0 to 9.5. An a* value of the magnetic stripe is preferably in the range of from −1 to +1, more preferably in the range of from −0.5 to 0.5. A b* value of the magnetic stripe is preferably in the range of from −1 to +1, more preferably in the range of from −1 to 0.

The magnetic stripe having the color tone of the above-mentioned L*a*b* color space is unlikely to be tinged with red due to the carbon black contained in the magnetic recording layer. Therefore, for example, when a jet-black substrate is used as the substrate, a magnetic recording medium of which the color is harmonized with the color of the substrate can be obtained.

The magnetic recording medium of the invention can be produced by, for example, stacking a laminate for heat transfer, which is mentioned below, on the surface of the substrate optionally with an adhesive layer interposed between the laminate and the substrate, heating the resultant stack at about 120 to 180° C. and applying a pressure to it to bond them to each other, and then removing a temporary support, which is mentioned below.

Then, if necessary, the resultant medium is subjected to hot-pressing so that the layer including the magnetic recording layer is embedded in the substrate, and, from the resultant medium, a piece of a predetermined size is punched out to complete a magnetic recording medium.

A laminate for heat transfer is used in producing the magnetic recording medium. The laminate may have a structure including: a temporary support; a protective layer (a) containing an aniline coloring material; and a magnetic recording layer, in which the protective layer (a) and the magnetic recording layer are stacked on the temporary support.

As the temporary support, a resin film is preferably used, and, especially, a polyethylene terephthalate film having excellent heat resistance and tensile strength is more preferably used. As the polyethylene terephthalate film, one having a thickness of 3 to 100 μm can be used.

With respect to the method for producing the laminate for heat transfer, the laminate can be produced by a method having the step of applying a coating composition for foaming a protective layer (a) onto a temporary support so that the thickness of the dried coating composition becomes 0.4 to 2.5 μm, and drying the applied composition to form a protective layer (a), the step of applying a coating composition for foaming a magnetic recording layer onto the protective layer (a) so that the thickness of the dried coating composition becomes 2 to 20 μm, and drying the applied composition to form a magnetic recording layer, and optionally the step of applying an adhesive onto the magnetic recording layer so that the thickness of the dried adhesive becomes 0.3 to 10 μm, and drying the applied adhesive to form an adhesive layer.

The laminate for heat transfer can be cut into an arbitrary form and used in that form.

EXAMPLES

Hereinbelow, the present invention will be described in more detail with reference to the following specific Examples and Comparative Examples.

Example 1

<Preparation of a Coating Composition for Forming a Magnetic Recording Layer>

The components shown below were charged into a vessel and kneaded together to obtain a coating composition for forming a magnetic recording layer.

| | |
|---|---|
| Barium ferrite magnetic powder | 36.6 Parts by mass ("MC-127", manufactured by Toda Kogyo Corp.) |
| Vinyl chloride resin | 6.9 Parts by mass ("SOLBIN AL", manufactured by Nissin Chemical Industry Co., Ltd.) |
| Polyurethane resin | 7.7 Parts by mass ("BURNOCK L7-750 (effective component: 35.0% by mass)", manufactured by DIC Corporation) |
| Carbon black | 3.5 Parts by mass ("Special Black 350", manufactured by Orion Engineered Carbons) |
| Dispersant | 0.2 Part by mass ("Solsperse 5000", manufactured by Lubrizol Japan Limited) |
| Methyl ethyl ketone | 20.5 Parts by mass |
| Toluene | 21.9 Parts by mass |
| Cyclohexanone | 7.6 Parts by mass |
| Isocyanate compound | 5.1 Parts by mass ("Hardener No. 10 (effective component: 37.5% by mass)", manufactured by DIC Corporation) |

<Preparation of a Coating Composition for Forming a Protective Layer (a1-1)>

The components shown below were charged into a vessel and kneaded together to obtain a coating composition for forming a protective layer (a1-1).

| | |
|---|---|
| Cellulose acetate | 2.4 Parts by mass ("L-AC L-20", manufactured by Daicel Corporation) |
| Cellulose acetate propionate | 4.6 Parts by mass ("CAP504-0.2", manufactured by Eastman Chemical Company) |
| Aniline black (aniline coloring material) | 3.2 Parts by mass ("toshiki black 5036", manufactured by Tokyo Shikizai Industry Co., Ltd.) |
| Tributyl acetylcitrate | 2.0 Parts by mass |
| Polyethylene wax | 0.3 Part by mass |
| Acetone | 23.5 Parts by mass |
| Ethyl acetate | 23.5 Parts by mass |
| Cyclohexanone | 18.4 Parts by mass |
| Toluene | 19.6 Parts by mass |
| Isocyanate compound. | 2.7 Parts by mass ("Hardener No 50 (effective component: 50% by mass)", manufactured by DIC Corporation) |

<Preparation of a Coating Composition for Forming a Protective Layer (a2-1)>

The components shown below were charged into a vessel and kneaded together to obtain a coating composition for forming a protective layer (a2-1).

| | |
|---|---|
| Cellulose acetate | 2.4 Parts by mass ("L-AC L-20", manufactured by Daicel Corporation) |
| Cellulose acetate propionate | 4.6 Parts by mass ("CAP504-0.2", manufactured by Eastman Chemical Company) |
| Aniline black (aniline coloring material) | 3.2 Parts by mass ("toshiki black 5036", manufactured by Tokyo Shikizai Industry Co., Ltd.) |
| Tributyl acetylcitrate | 2.0 Parts by mass |
| Acetone | 23.5 Parts by mass |
| Ethyl acetate | 23.5 Parts by mass |
| Cyclohexanone | 18.4 Parts by mass |
| Toluene | 19.6 Parts by mass |
| Isocyanate compound | 2.7 Parts by mass ("Hardener No. 50 (effective component: 50% by mass)", manufactured by DIC Corporation) |

<Adhesive>

The components shown below were charged into a vessel and mixed together to obtain an adhesive.

| | |
|---|---|
| Vinyl chloride-vinyl acetate-dicarboxylic acid copolymer | 10.8 Parts by mass("SOLBIN M5", manufactured by Nissin Chemical Industry Co., Ltd.) |
| Polyurethane resin | 18.0 Parts by mass ("TS-03", manufactured by DIC Corporation) |
| Methyl ethyl ketone | 25.5 Parts by mass |
| Toluene | 45.5 Parts by mass |

<Production of a Laminate for Heat Transfer>

A coating composition for forming a protective layer (a2-1) was applied onto a polyethylene terephthalate film, which is a temporary support, and dried to form a protective layer (a2-1) having a thickness of 0.4 μm. A coating composition for foaming a protective layer (a1-1) was applied onto the protective layer (a2-1) and dried to form a protective layer (a1-1) having a thickness of 1.6 μm. A coating composition for foaming a magnetic recording layer was applied onto the protective layer (a1-1) and dried to foam a magnetic recording layer having a thickness of 8 μm. The adhesive was applied onto the magnetic recording layer and dried to form an adhesive layer having a thickness of 1.5 μm. The laminate comprising the temporary support/protective layer (a2-1)/protective layer (a1-1)/magnetic recording layer/adhesive layer obtained by the above-mentioned method was used as a laminate for heat transfer.

<Production of a Magnetic Recording Medium>

The laminate for heat transfer was stacked on a polyvinyl chloride sheet (substrate) having a thickness of 100 μm so that the adhesive layer of the laminate was in contact with the sheet, and subjected to hot-pressing at 120° C. and at 1 kg/cm² for one second using Heat Seal Tester (manufactured by Tester Sangyo Co., Ltd.). Then, the temporary support was removed to obtain a laminate in which a magnetic stripe comprising the protective layer (a2-1), the protective layer (a1-1), the magnetic recording layer, and the adhesive layer was laminated on the polyvinyl chloride sheet.

Then, a polyvinyl chloride sheet having a thickness of 650 µm and having a black printed layer on the surface and the laminate were stacked on one another. In this instance, they were stacked so that the black printed layer of the polyvinyl chloride sheet was in contact with the plane made of the polyvinyl chloride sheet having a thickness of 100 µm constituting the laminate. The resultant stacked material was subjected to hot-pressing at 145° C. and at 10 kg/cm² for 20 minutes using a platen press machine (manufactured by Toyo Seiki Seisaku-Sho, Ltd.) to produce a magnetic recording medium.

Example 2

<Preparation of a Coating Composition for Forming a Protective Layer (a1-2)>

The components shown below were charged into a vessel and kneaded together to obtain a coating composition for forming a protective layer (a1-2).

| | |
|---|---|
| Cellulose acetate | 2.4 Parts by mass ("L-AC L-20", manufactured by Daicel Corporation) |
| Cellulose acetate propionate | 4.6 Parts by mass ("CAP504-0.2", manufactured by Eastman Chemical Company) |
| Aniline black (aniline coloring material(D)) | 5.7 Parts by mass ("toshiki black 5036", manufactured by Tokyo Shikizai Industry Co., Ltd.) |
| Tributyl acetylcitrate | 3.6 Parts by mass |
| Acetone | 23.5 Parts by mass |
| Ethyl acetate | 23.5 Parts by mass |
| Cyclohexanone | 18.4 Parts by mass |
| Toluene | 19.6 Parts by mass |
| Isocyanate compound | 2.7 Parts by mass("Hardener No. 50 (effective component: 50%)", manufactured by DIC Corporation) |

<Formulation of a Coating Composition for Forming a Protective Layer (a2-2)>

The components shown below were charged into a vessel and kneaded together to obtain a coating composition for forming a protective layer (a2-2).

| | |
|---|---|
| Cellulose acetate | 2.4 Parts by mass ("L-AC L-20", manufactured by Daicel Corporation) |
| Cellulose acetate propionate | 4.6 Parts by mass ("CAP504-0.2", manufactured by Eastman Chemical Company) |
| Aniline black (aniline coloring material) | 5.7 Parts by mass ("toshiki black 5036", manufactured by Tokyo Shikizai Industry Co., Ltd.) |
| Tributyl acetylcitrate | 3.6 Parts by mass |
| Acetone | 23.5 Parts by mass |
| Ethyl acetate | 23.5 Parts by mass |
| Cyclohexanone | 18.4 Parts by mass |
| Toluene | 19.6 Parts by mass |
| Isocyanate compound | 2.7 Parts by mass("Hardener No. 50 (effective component: 50% by mass)", manufactured by DIC Corporation) |

A laminate for heat transfer and a magnetic recording medium were produced in substantially the same manner as in Example 1 except that, instead of the coating composition for foaming a protective layer (a1-1), a coating composition for forming a protective layer (a1-2) was used, and that, instead of the coating composition for forming a protective layer (a2-1), a coating composition for forming a protective layer (a2-2) was used.

Example 3

<Preparation of a Coating Composition for Forming a Protective Layer (a1-3)>

The components shown below were charged into a vessel and kneaded together to obtain a coating composition for forming a protective layer (a2-3).

| | |
|---|---|
| Cellulose acetate | 2.4 Parts by mass ("L-AC L-20", manufactured by Daicel Corporation) |
| Cellulose acetate propionate | 4.6 Parts by mass ("CAP504-0.2", manufactured by Eastman Chemical Company) |
| Aniline black (aniline coloring material) | 5.7 Parts by mass ("toshiki black 5036", manufactured by Tokyo Shikizai Industry Co., Ltd.) |
| Tributyl acetylcitrate | 2.0 Parts by mass |
| Polyethylene wax | 0.3 Part by mass |
| Acetone | 23.5 Parts by mass |
| Ethyl acetate | 23.5 Parts by mass |
| Cyclohexanone | 18.4 Parts by mass |
| Toluene | 19.6 Parts by mass |
| Isocyanate compound | 2.7 Parts by mass("Hardener No. 50 (effective component: 50% by mass)", manufactured by DIC Corporation) |

<Preparation of a Coating Composition for Forming a Protective Layer (a2-3)>

The components shown below were charged into a vessel and kneaded together to obtain a coating composition for forming a protective layer (a2-3).

| | |
|---|---|
| Cellulose acetate | 2.4 Parts by mass ("L-AC L-20", manufactured by Daicel Corporation) |
| Cellulose acetate propionate | 4.6 Parts by mass ("CAP504-0.2", manufactured by Eastman Chemical Company) |
| Acetone | 23.5 Parts by mass |
| Ethyl acetate | 23.5 Parts by mass |
| Cyclohexanone | 18.4 Parts by mass |
| Toluene | 19.6 Parts by mass |
| Isocyanate compound | 2.7 Parts by mass("Hardener No. 50 (effective component: 50% by mass)", manufactured by DIC Corporation) |

A laminate for heat transfer and a magnetic recording medium were produced in substantially the same manner as in Example 1 except that, instead of the coating composition for foaming a protective layer (a1-1), a coating composition for foaming a protective layer (a1-3) was used, and that, instead of the coating composition for forming a protective layer (a2-1), a coating composition for foaming a protective layer (a2-3) was used.

Comparative Example 1

<Preparation of a Coating Composition for Forming a Protective Layer (a1-4)>

The components shown below were charged into a vessel and kneaded together to obtain a coating composition for forming a protective layer (a1-4).

| | |
|---|---|
| Cellulose acetate | 2.4 Parts by mass ("L-AC L-20", manufactured by Daicel Corporation) |
| Cellulose acetate propionate | 4.6 Parts by mass ("CAP504-0.2", manufactured by Eastman Chemical Company) |
| Polyethylene wax | 0.3 Part by mass |
| Acetone | 23.5 Parts by mass |
| Ethyl acetate | 23.5 Parts by mass |
| Cyclohexanone | 18.4 Parts by mass |
| Toluene | 19.6 Parts by mass |
| Isocyanate compound | 2.7 Parts by mass("Hardener No. 50 (effective component: 50% by mass)", manufactured by DIC Corporation) |

<Formulation of a Coating Composition for Forming a Protective Layer (a2-4)>

The components shown below were charged into a vessel and kneaded together to obtain a coating composition for forming a protective layer (a2-4).

| | |
|---|---|
| Cellulose acetate | 2.4 Parts by mass ("L-AC L-20", manufactured by Daicel Corporation) |
| Cellulose acetate propionate | 4.6 Parts by mass ("CAP504-0.2", manufactured by Eastman Chemical Company) |
| Acetone | 23.5 Parts by mass |
| Ethyl acetate | 23.5 Parts by mass |
| Cyclohexanone | 18.4 Parts by mass |
| Toluene | 19.6 Parts by mass |
| Isocyanate compound | 2.7 Parts by mass("Hardener No. 50 (effective component: 50% by mass)", manufactured by DIC Corporation) |

A laminate for heat transfer and a magnetic recording medium were produced in substantially the same manner as in Example 1 except that, instead of the coating composition for foaming a protective layer (a1-1), a coating composition for foaming a protective layer (a1-4) was used, and that, instead of the coating composition for forming a protective layer (a2-1), a coating composition for foaming a protective layer (a2-4) was used.

Comparative Example 2

<Formulation of a Coating Composition for Forming a Protective Layer (a1-5)>

The components shown below were charged into a vessel and kneaded together to obtain a coating composition for forming a protective layer (a1-5).

| | |
|---|---|
| Cellulose acetate | 2.4 Parts by mass ("L-AC L-20", manufactured by Daicel Corporation) |
| Cellulose acetate propionate | 4.6 Parts by mass ("CAP504-0.2", manufactured by Eastman Chemical Company) |
| Carbon black | 3.2 Parts by mass ("Degussa FW200", manufactured by Orion Engineered Carbons) |
| Dispersant | 0.4 Part by mass ("Solsperse 5000", manufactured by Lubrizol Japan Limited) |
| Tributyl acetylcitrate | 2.0 Parts by mass |
| Polyethylene wax | 0.3 Part by mass |
| Acetone | 23.5 Parts by mass |
| Ethyl acetate | 23.5 Parts by mass |
| Cyclohexanone | 18.4 Parts by mass |
| Toluene | 19.6 Parts by mass |
| Isocyanate compound | 2.7 Parts by mass("Hardener No. 50 (effective component: 50% by mass)", manufactured by DIC Corporation) |

<Preparation of a Coating Composition for Forming a Protective Layer (a2-5)>

The components shown below were charged into a vessel and kneaded together to obtain a coating composition for forming a protective layer (a2-5).

| | |
|---|---|
| Cellulose acetate | 2.4 Parts by mass ("L-AC L-20", manufactured by Daicel Corporation) |
| Cellulose acetate propionate | 4.6 Parts by mass ("CAP504-0.2", manufactured by Eastman Chemical Company) |
| Carbon black | 3.2 Parts by mass ("Degussa FW200", manufactured by Orion Engineered Carbons) |
| Dispersant | 0.4 Part by mass ("Solsperse 5000", manufactured by Lubrizol Japan Limited) |
| Tributyl acetylcitrate | 2.0 Parts by mass |
| Acetone | 23.5 Parts by mass |
| Ethyl acetate | 23.5 Parts by mass |
| Cyclohexanone | 18.4 Parts by mass |
| Toluene | 19.6 Parts by mass |
| Isocyanate compound | 2.7 Parts by mass("Hardener No. 50 (effective component: 50% by mass)", manufactured by DIC Corporation) |

A laminate for heat transfer and a magnetic recording medium were produced in substantially the same manner as in Example 1 except that, instead of the coating composition for foaming a protective layer (a1-1), a coating composition for foaming a protective layer (a1-5) was used, and that, instead of the coating composition for forming a protective layer (a2-1), a coating composition for foaming a protective layer (a2-5) was used.

Test Items and Test Results

<Test for Jet-Black Color Properties>

With respect to the obtained magnetic recording medium, values in a CIE 1976 (L*a*b*) color space were measured from the plane side made of the protective layer of the magnetic stripe of the magnetic recording medium using "Spectro Color Meter SE2000", manufactured by Nippon Denshoku Industries Co. Ltd. A magnetic recording medium in which the L value was in the range of from 0 to 10, the a* value was in the range of from −1 to +1, and the b* value was in the range of from −1 to +1 was rated "○". A magnetic recording medium in which any of the above values was outside of the above-mentioned respective ranges was rated "x".

<Test for Abrasion Resistance>

Using Card Reader Writer (manufactured by Hitachi-Omron Terminal Solutions, Corp.), a reading operation for the magnetic recording medium was repeated 20,000 times. A magnetic recording medium such that, after the reading operation was repeated 20,000 times, the medium was usable without having a defect in the protective layer and the magnetic recording layer constituting the magnetic stripe was considered to have excellent abrasion resistance and rated "○". A magnetic recording medium such that, after the reading operation was repeated less than 20,000 times, the magnetic recording layer of the magnetic stripe wore due to abrasion with the magnetic head to be partially or completely lost was considered to have poor abrasion resistance and rated "x".

<Test for Interference Fringe>

With respect to the magnetic stripe of the obtained magnetic recording medium, the reflected light of a fluorescent lighting was visually examined to check whether an interference fringe was seen. A magnetic recording medium such that no interference fringe could be confirmed was rated "○", and a magnetic recording medium such that an interference fringe could be confirmed was rated "x".

TABLE 1

| | Test for jet-black color properties | | | Test for | Test for |
| --- | --- | --- | --- | --- | --- |
| | L | a* | b* | Evaluation | abrasion resistance | interference fringe |
| Example 1 | 9.5 | 0.2 | 0.2 | ○ | ○ | ○ |
| Example 2 | 9.2 | 0.2 | −0.8 | ○ | x | ○ |
| Example 3 | 9.8 | 0.1 | 0.4 | ○ | ○ | x |
| Comparative Example 1 | 10.6 | 0.3 | 1.1 | x | ○ | ○ |
| Comparative Example 2 | 11.2 | 0 | −0.4 | x | ○ | ○ |

The invention claimed is:

1. A magnetic recording medium comprising:
   a magnetic recording layer on a substrate; and
   a protective layer (a) on the magnetic recording layer, wherein
   the protective layer (a) contains an aniline coloring material, the aniline coloring material is contained in an amount in the range of from 20 to 40% by mass, based on the mass of the protective layer (a),
   the protective layer (a) comprises a protective layer (a1) and a protective layer (a2) as viewed from a side in contact with the magnetic recording layer, wherein the protective layer (a1) and the protective layer (a2) each contain the aniline coloring material,
   the aniline coloring material is aniline black, and
   the protective layer has a thickness of 0.4 μm or more to 2.5 μm or less.

2. The magnetic recording medium according to claim 1, wherein the aniline coloring material contains no chromium ion or has a chromium ion content of 2 ppm or less.

3. The magnetic recording medium according to claim 1, wherein the magnetic recording layer contains carbon black, wherein the content of the carbon black in the magnetic recording layer is in the range of from 2 to 10% by mass.

4. The magnetic recording medium according to claim 1, which has an L value in the range of from 0 to 10, an a* value in the range of from −1 to +1, and a b* value in the range of from −1 to +1 in a CIE 1976 (L*a*b*) color space as observed from the surface side of the protective layer (a).

5. The magnetic recording medium according to claim 1, wherein the protective layer (a) is in direct contact with the magnetic recording layer.

6. A laminate for heat transfer comprising:
   a protective layer (a) on a temporary support; and
   a magnetic recording layer on the protective layer (a), wherein
   the protective layer (a) is a layer containing an aniline coloring material, the aniline coloring material is contained in an amount in the range of from 20 to 40% by mass, based on the mass of the protective layer (a),
   the protective layer (a) comprises a protective layer (a1) and a protective layer (a2) as viewed from a side in contact with the magnetic recording layer, wherein the protective layer (a1) and the protective layer (a2) each contain the aniline coloring material,
   the aniline coloring material is aniline black, and
   the protective layer has a thickness of 0.4 μm or more to 2.5 μm or less.

7. The laminate for heat transfer according to claim 6, wherein the protective layer (a) is in direct contact with the magnetic recording layer.

8. A method for producing a magnetic recording medium, the method comprising the steps of:
   transferring the laminate for heat transfer according to claim 6 onto the substrate optionally with an adhesive layer interposed between the laminate and the substrate; and
   removing the temporary support.

* * * * *